March 16, 1965  E. J. GRIFFITH  3,173,756
DOUBLE NITRATE SALTS AND METHODS FOR THEIR PREPARATION
Filed Nov. 16, 1960
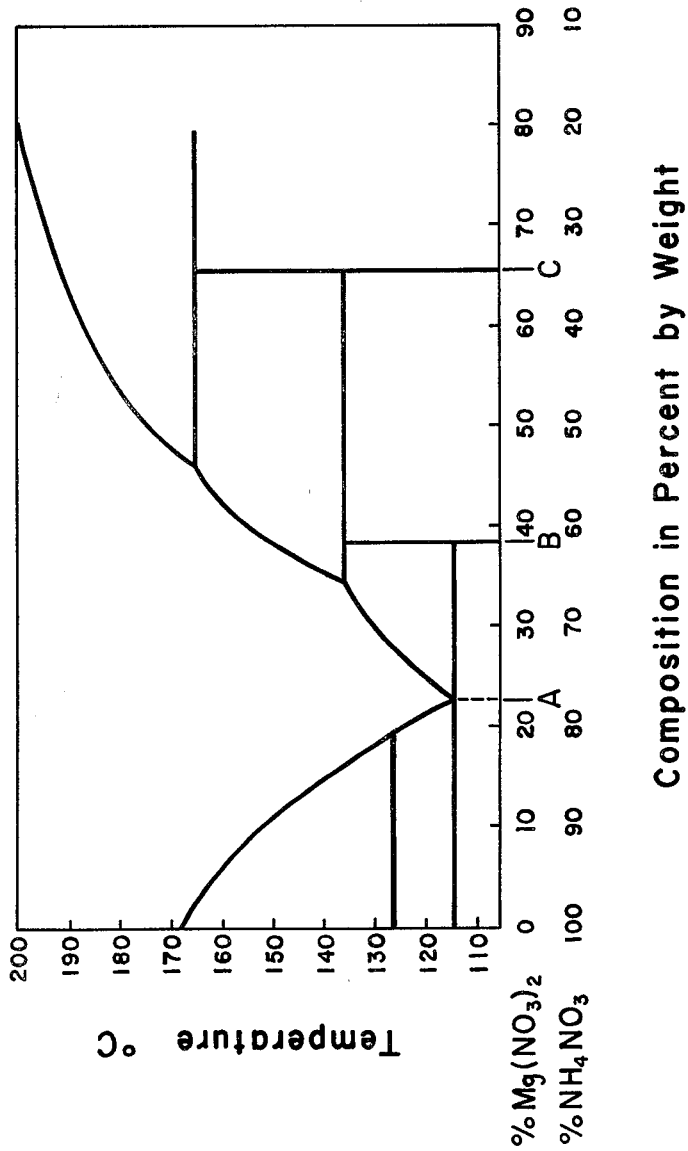
INVENTOR
EDWARD J. GRIFFITH
BY Roger R. Jones
ATTORNEY 3,173,756
DOUBLE NITRATE SALTS AND METHODS
FOR THEIR PREPARATION
Edward J. Griffith, Manchester, Mo., assignor to
Monsanto Company, a corporation of Delaware
Filed Nov. 16, 1960, Ser. No. 69,640
12 Claims. (Cl. 23—102)

This invention relates to novel compositions of matter and methods of making the same. More specifically, the invention relates to new inorganic nitrate double salts and compositions containing the same.

Inorganic double salts are well known in inorganic chemistry, but prior to this invention no double salts of magnesium and ammonium nitrates have been reported. It has now been found, however, that under the proper conditions such double salts can be formed and once formed are stable and useful compounds.

The new compounds of this invention can be represented by the following formula:

$$(NH_4)_n Mg(NO_3)_{n+2}$$

wherein "$n$" represents an odd numbered integer of from 1 to 3 inclusive. New compounds of the above formula are prepared by a process which comprises introducing magnesium oxide or the equivalent into molten ammonium nitrate under such conditions that a solution of magnesium nitrate in molten ammonium nitrate results. The product can then be solidified by cooling in any suitable manner.

Double salts prepared in accordance with this invention are useful per se as fertilizers but are primarily useful as additives to impart dimensional stability to ammonium nitrate materials. In the production and storage of compact forms of ammonium nitrate, it is difficult to maintain the external and internal structure of the initial compact form because of discontinuous density changes which occur when the compact form passes in either direction through a 32° C. transition temperature. As a result of such density changes, compact forms of ammonium nitrate crack or crumble internally and may be eventually reduced to a fine powder. These undesirable phase transition effects are well known with respect to ammonium nitrate explosive and fertilizer materials. It has been found that the addition of a small percentage of one of the double salts of this invention to ammonium nitrate prior to its being formed into a compacted form results in the crystalline phase change, which is normally observed at about 32° C., not being discernible until a temperature of about 50° C. is reached. A temperature of 50° C. is above any temperature normally encountered in storage of ammonium nitrate compositions so that damage to solidified forms of ammonium nitrate as a result of temperature instability is eliminated. While magnesium nitrate alone can be employed in the stabilization of ammonium nitrate compositions, the use of a double salt in accordance with this invention is highly advantageous for the reason that ammonium nitrate compositions are much less hygroscopic when a double salt is employed for stabilization than when magnesium nitrate is employed for stabilization.

Another advantage in the use of a double salt of this invention in the preparation of temperature stabilized ammonium nitrate compositions is that the salt can readily be prepared in anhydrous form and does not result in the formation of water or other objectionable materials when added to molten ammonium nitrate. This represents the first instance of a material having this advantage as will be seen from the fact that magnesium oxide forms water when added to ammonium nitrate; magnesium nitrate is commercially available only as a hexahydrate and its addition to ammonium nitrate undesirably increases the moisture level; and magnesium carbonate produces carbon dioxide when added to ammonium nitrate and results in undesirable bubbling in the mixture. In contrast, the compounds of this invention when added as an anhydrous melt do not increase the moisture level and do not result in undesirable bubbling.

The ammonium nitrate employed in the manufacture of the new double salts of this invention can be prepared in any conventional manner except that it is preferably as low in water and free acid content as possible. The double salts of this invention are decomposed by aqueous mediums unless the medium is highly basic and any substantial quantities of free acid and water in the ammonium nitrate used in accordance with this invention may result merely in the formation of a mechanical mixture rather than in the formation of a double salt. As a general rule, the water content of a molten ammonium nitrate mixture employed in accordance with this invention should be below about 5% by weight and preferably below about 1% by weight. Low water content becomes increasingly important as the amount of free acidity in the ammonium nitrate mixture increases or, in other words, increasing free acid content is increasingly deleterious with increasing water content. As a general rule, the free acid content should not be in excess of about 1 mole of free acid for each mole of magnesium oxide to be added or the equivalent, and preferably the free acid content is such that ammonium nitrate must be decomposed with the liberation of ammonia to provide at least a portion of the nitrate anions necessary for the formation of the desired double salt.

As mentioned above, the magnesium necessary for the formation of a double salt in accordance with this invention is preferably added in the form of magnesium oxide. There are possible alternatives but the use of magnesium oxide serves to eliminate free acid which might be present in the ammonium nitrate at the time of the addition of the source of magnesium and is additionally advantageous for the reason that the shortest time interval is necessary for the formation of the desired double salt or salts. Magnesium nitrate can be employed in lieu of magnesium oxide but the use of magnesium nitrate is not advantageous for the reason that the use of this material may result in a surplus of nitrate ions and excess water being present and, as set forth above, the presence of excess nitrate ions makes the formation of double salts more difficult if not impossible. Magnesium hydroxide can be employed but the hydroxide is not readily transformed into the nitrate under the most desirable process conditions of this invention and, in addition, results in the water content of the molten ammonium nitrate to which the source of magnesium is added being raised to an undesirably high level. The use of dead burned magnesium oxide is preferable because this form hydrates less rapidly than other commercially available forms and is less apt to be hydrated by any free water present in the ammonium nitrate to which it is added.

The amount of magnesium oxide or the equivalent added to molten ammonium nitrate in accordance with the process of this invention depends upon the particular double salt that one desires to produce. If one adds less than the equivalent of about 38% by weight of magnesium nitrate, only $(NH_4)_3Mg(NO_3)_5$ will be formed; if one adds more than the equivalent of about 38% magnesium nitrate but less than about the equivalent of 65% magnesium nitrate, a mixture of $NH_4Mg(NO_3)_3$ and $(NH_4)_3Mg(NO_3)_5$ will be formed; and if one adds more than the equivalent of about 65% magnesium nitrate only $NH_4Mg(NO_3)_3$ will be formed. (Applicant has found some evidence of a double salt containing magnesium nitrate in an amount more than 65% by weight but such evidence is inconclusive.

A better understanding of the character of the compositions of the present invention can be gained by reference to the drawing, which is a diagram of phase transition temperature as a function of composition expressed in terms of percent by weight of magnesium nitrate and ammonium nitrate. From this phase diagram it can be seen that when the percentage of magnesium nitrate is about 38% by weight and the percentage of ammonium nitrate is about 62% by weight, a double salt corresponding to the composition $(NH_4)_3Mg(NO_3)_5$ is formed. This double salt melts incongruently at a temperature of about 137° C. and is indicated on the phase diagram at the line "B." If the percentage by weight of magnesium nitrate is below about 38% by weight, it will be seen from the phase diagram that a mixture of the double salt $(NH_4)_3Mg(NO_3)_5$ and ammonium nitrate exists and forms an eutectic when the magnesium content of the mixture is equivalent to 23% by weight magnesium nitrate. This eutectic mixture melts at about 115° C. and is indicated at the point "A" on the phase diagram. When the magnesium content of a mixture is equivalent to about 65% by weight magnesium nitrate a double salt of the formula $NH_4Mg(NO_3)_3$ is formed. This double salt melts incongruously at a temperature of about 167° C. and is indicated on the phase diagram by the line "C."

The compositions of the present invention are obtained primarily as crystalline solids but can be obtained as glasses under some conditions. For example, one tends to obtain glasses when the free nitric acid or water content is excessive. Except under conditions favoring the formation of glasses, the crystalline double salts can be obtained from a molten melt by cooling the melt in any conventional manner. For example, the melt can be allowed to cool by reducing the ambient temperature to below the solidification temperature of the melt, for example, below about 110° C., or, alternatively, the molten material can be prilled by the same procedures used for prilling ammonium nitrate fertilizers. In the form of prills or the like the new double salts of this invention can conveniently be added to molten ammonium nitrate to produce a fertilizer or explosive composition stabilized against phase transition as a result of temperature fluctuations in the vicinity of 32° C.

The invention will now be illustrated by the following specific examples in which all parts are by weight unless otherwise indicated.

*Example 1*

In a suitable reaction vessel there is placed 36 parts of ammonium nitrate and the temperature thereof raised to about 200° C. Free ammonia is bubbled through the molten ammonium nitrate to remove excess acidity and the moisture content of the molten ammonium nitrate is reduced to 0.5%. If necessary, a tubular evaporator can be employed for this purpose. To the molten ammonium nitrate there is added a small quantity of dead burned magnesium oxide sufficient to result in turbidity. The mixture is then retained at 200° C. and agitated until it again becomes clear. Further additions of magnesium oxide are then made employing the same technique until the equivalent of a total of 65 parts of magnesium nitrate have been added. The mixture is then prilled using a conventional prilling tower and the prilled product is collected and stored in moistureproof containers. The product is a double salt of the formula $NH_4Mg(NO_3)_3$ which melts incongruously at 167° C. Chemical analysis of the prilled product was as follows:

|  | Theory, percent | Found, percent |
| --- | --- | --- |
| Total Nitrogen | 24.52 | 24.92 |
| Ammoniacal Nitrogen | 6.13 | 6.91 |
| Magnesium Oxide | 17.64 | 17.59 |

Existence of a double salt is clearly shown by X-ray diffraction and by the phase diagram for the system.

The procedure of this example can be practiced using only the precautions conventionally employed when handling ammonium nitrate.

The minimum length of time required for the magnesium oxide additions will vary from about 3–4 hours for small laboratory quantities up to 12–20 hours for 1000 to 1500 lbs. quantities.

*Example 2*

Example 1 is repeated except that 62 parts of ammonium nitrate and 38 parts of magnesium nitrate are employed. The resulting product is a double salt of the formula $(NH_4)_3Mg(NO_3)_5$ which melts incongruously at about 137° C. The chemical analysis of this product is as follows:

|  | Theory, percent | Found, percent |
| --- | --- | --- |
| Total Nitrogen | 28.84 | 28.58 |
| Ammoniacal Nitrogen | 10.81 | 10.94 |
| Magnesium Oxide | 10.37 | 10.12 |

Again the existence of a double salt is shown by X-ray diffraction and the phase diagram.

*Example 3*

In a suitable reaction vessel there is placed 67 parts of ammonium nitrate and the temperature is raised to about 200° C. The moisture level of the ammonium nitrate is then reduced to about 0.5% by any suitable procedure and to the dehydrated material there is added 33 parts of magnesium nitrate. The resulting slightly acidic molten mixture is then sprayed into a prilling tower under such conditions that exceedingly small drops are formed, and preferably the spray is as fine as is possible without the loss by entrainment in the cooling medium becoming excessive. The prills are then collected and stored in moistureproof bags.

Analysis of prills prepared as above shows that the prills are composed of a glassy material which is for the most part a double salt of the formula $NH_4Mg(NO_3)_3$. The prilled material, in addition to being useful as a fertilizer, is useful as an oxidizing agent in the formulation of explosives and rocket fuels, and is highly advantageous for the last mentioned use because it contains, on an equal weight basis, latent energy in excess of that of a comparable crystalline material, such additional latent energy being approximately equal to the energy of crystallization of the crystalline material. This makes possible rocket fuels providing higher thrust per unit weight of fuel and is believed to be the first instance of a glassy ammonium nitrate material suitable for use in preparing rocket fuels. In addition, the prilled material has the advantage of having an exceptionally high bulk density, is free flowing and temperature stable under normal storage conditions.

*Example 4*

In a suitable reaction vessel there is placed 1000 parts of ammonium nitrate and the temperature thereof raised until the ammonium nitrate is in the molten stage. Gaseous ammonia is then introduced into the molten ammonium nitrate to remove excess acidity and the moisture content is reduced below 0.5% by weight if necessary. There is then added 5% by weight of the prilled product of Example 2 and the resulting mixture stirred until homogeneous. The mixture is then prilled to produce a product which undergoes a transition at a temperature of about 50° C. instead of the 32° C. temperature characteristic of pure ammonium nitrate.

For comparative purposes a similar product containing an equal amount of magnesium is prepared simply by adding magnesium nitrate to molten ammonium nitrate. After 15 hours at 25° C. and 62% relative humidity the product made by the addition of magnesium nitrate had gained 1.7% by weight due to the absorption of moisture whereas the product prepared by the addition of the double salt of the formula $NH_4Mg(NO_3)_3$ had gained only 0.8% by weight. It will be seen, therefore, that the use of the double salt reduces the hygroscopicity, as compared to a product made by mixing ammonium nitrate and magnesium nitrate, by approximately 50%.

Only a very small amount of a double salt in accordance with this invention is necessary for satisfactory temperature stabilization of ammonium nitrate if the water content of the ammonium nitrate material is at a satisfactory level. Under favorable conditions a degree of stabilization can be obtained employing an amount of a double salt in accordance with this invention equivalent to only about 0.2% magnesium nitrate (i.e., 0.5%

$$(NH_4)_3Mg(NO_3)_5$$

or 0.3% $NH_4Mg(NO_3)_3$), but preferably there is employed an amount of the double salt equivalent to at least about 1% magnesium nitrate (i.e., 2.6%

$$(NH_4)_3Mg(NO_3)_5$$

or 1.5% $NH_4Mg(NO_3)_3$). There is no upper limit as to the amount of double salt that can be satisfactorily employed since the double salt in pure form is a satisfactorily stabilized composition suitable for fertilizer use, but usually there is little or no advantage in employing more than about 30% $(NH_4)_3Mg(NO_3)_5$ or 18% $NH_4Mg(NO_3)_3$.

The amount of water that can be satisfactorily present in an ammonium nitrate composition stabilized with a double salt in accordance with this invention depends upon the amount of double salt employed. If the stabilized composition is substantially pure double salt, it may contain as much as 5% or more moisture and be satisfactory in all respects, but if a near minimum quantity of the double salt is to be used, the moisture content of the ammonium nitrate composition should be below about 2% and preferably below about 0.5%. If the moisture level of the stabilized product is determined to be excessive, it is an advantage of products stabilizing in accordance with this invention that the moisture level can be lowered by conventional drying techniques.

Having thus described my invention and several specific embodiments thereof, what I desire to claim and secure by Letters Patent is:

1. A composition comprising a double salt of the formula $(NH_4)_nMg(NO_3)_{n+2}$, wherein $n$ represents an odd numbered integer from 1 to 3 inclusive.
2. A double salt of the formula $NH_4Mg(NO_3)_3$.
3. A double salt of the formula $(NH_4)_3Mg(NO_3)_5$.
4. A dimensionally stabilized ammonium nitrate composition containing at least about 0.3% of a double salt of the formula $NH_4Mg(NO_3)_3$, said stabilized composition having a moisture content below about 5% by weight.
5. A composition according to claim 4 containing between about 1.5% and 18% of said double salt and having a moisture content below about 2% by weight.
6. A method of making double salts of the formula $(NH_4)_nMg(NO_3)_{n+2}$, wherein $n$ represents an odd numbered integer from 1 to 3 inclusive, which comprises adding a magnesium compound selected from the group consisting of magnesium oxide, magnesium nitrate, magnesium carbonate and magnesium hydroxide to molten ammonium nitrate having a moisture content of less than about 5% by weight and a free nitric acid content not substantially in excess of that necessary for the transformation of said magnesium compound into magnesium nitrate, stirring the molten mixture until a clear solution is obtained, and thereafter cooling said mixture to effect solidification.
7. A method according to claim 6 wherein the ratio of said magnesium compound to the ratio of ammonium nitrate is such as to produce a mixture containing the equivalent of approximately 65% by weight magnesium nitrate so that a double salt of the formula $NH_4Mg(NO_3)_3$ is produced.
8. A method according to claim 7 wherein said magnesium compound is magnesium oxide.
9. The method of claim 6 wherein the amount of said magnesium compound added is sufficient to produce a mixture containing the equivalent of 38% by weight magnesium nitrate so that a double salt of the formula $(NH_4)_3Mg(NO_3)_5$ is produced.
10. A method according to claim 9 wherein said magnesium compound is magnesium oxide.
11. A prilled product comprising prills of a glassy double salt of the formula $NH_4Mg(NO_3)_3$ useful as an oxidizing agent in the formulation of explosives and rocket fuels.
12. A dimensionally stablized ammonium nitrate composition containing at least 0.03% of a double salt of the formula $(NH_4)_3Mg(NO_3)_5$, said stabilized composition having a moisture content below about 5% by weight.

References Cited in the file of this patent

UNITED STATES PATENTS

| | | |
|---|---|---|
| 1,840,229 | Hamprecht | Jan. 5, 1932 |
| 1,868,890 | Eyer | July 26, 1932 |
| 1,910,807 | Mohler | May 23, 1933 |
| 2,382,298 | Datin | Aug. 11, 1945 |
| 3,030,179 | McFarlin et al. | Apr. 17, 1962 |

FOREIGN PATENTS

| | | |
|---|---|---|
| 573,147 | Great Britain | Nov. 8, 1945 |